US006820730B2

(12) United States Patent  
Angerfors

(10) Patent No.: US 6,820,730 B2
(45) Date of Patent: Nov. 23, 2004

(54) BRAKE LINING WEAR ADJUSTER ASSEMBLY

(75) Inventor: Dan Angerfors, Floda (SE)

(73) Assignee: Volvo Lastvagnar AB, Göteborg (SE)

( * ) Notice: Subject to any disclaimer, the term of this patent is extended or adjusted under 35 U.S.C. 154(b) by 77 days.

(21) Appl. No.: 10/248,679

(22) Filed: Feb. 7, 2003

(65) Prior Publication Data

US 2003/0173164 A1 Sep. 18, 2003

Related U.S. Application Data

(63) Continuation of application No. 09/428,260, filed on Oct. 27, 1999, now abandoned, which is a continuation of application No. PCT/SE98/00762, filed on Apr. 27, 1998.

(30) Foreign Application Priority Data

Apr. 28, 1997 (SE) .............................................. 9701589

(51) Int. Cl.[7] .............................................. F16D 65/16
(52) U.S. Cl. ...................... 188/719; 188/72.7; 188/72.9
(58) Field of Search .............................. 158/71.7, 71.8, 158/71.9, 72.8, 72.9, 1.11 W, 196 P, 196 B, 196 BA, 196 D

(56) References Cited

U.S. PATENT DOCUMENTS

| 4,819,768 A | * | 4/1989 | Czich et al. ............. 188/196 D |
| 4,830,149 A | * | 5/1989 | Giering ..................... 188/71.9 |
| 5,819,884 A | * | 10/1998 | Giering ..................... 188/71.9 |
| 6,276,494 B1 | * | 8/2001 | Ward et al. ............ 188/1.11 W |

* cited by examiner

Primary Examiner—Douglas C. Butler
Assistant Examiner—Bradley King
(74) Attorney, Agent, or Firm—Novak Druce LLP

(57) ABSTRACT

An adjuster assembly for compensating for brake lining wear in a brake unit. The brake unit has a housing for accommodating the adjuster assembly, a brake lever journalled to the housing, and a force transmitter for transmitting displacement of the brake lever to at least one brake lining. The adjuster assembly includes a support shaft, sensing means for cooperation with the brake lever, a drive ring assembly cooperating with the sensor, and an adjuster gear. The adjuster gear cooperates with the drive ring assembly. To prevent unwanted release of the adjuster assembly, the engagement surface is provided with rotation a rotation preventer adapted for releasable engagement with engagement member cooperating with the housing for preventing rotation of the transmission ring assembly in one direction.

12 Claims, 3 Drawing Sheets

BRAKE LINING WEAR ADJUSTER ASSEMBLY

CROSS REFERENCE TO RELATED APPLICATIONS

This present application is a continuation patent application of U.S. patent application Ser. No. 09/428,260 filed Oct. 27, 1999 now abandoned which is a continuation application of International Application Number PCT/SE98/00762 filed Apr. 27, 1998 which was published in English pursuant to Article 21(2) of the Patent Cooperation Treaty, and which claims priority to Swedish Application No. 9701589-5 filed Apr. 28, 1997. The full disclosure of said applications, in their entireties, are hereby expressly incorporated by reference into the present application.

BACKGROUND OF INVENTION

1. Technical Field

The present invention relates to an adjuster assembly for compensating for brake lining wear in a brake unit. The invention further relates to a brake unit comprising an adjuster assembly, as well as to a vehicle equipped with a brake unit comprising an adjuster assembly.

2. Background of the Invention

Braking systems for heavy goods vehicles are presently generally powered by compressed air. A typical braking system comprises a brake unit mounted on a hub of a wheel to be braked. A pneumatic actuator is arranged on the brake unit such that the actuator acts on a brake lever pivotally supported in the brake unit. Displacement of the brake lever causes friction linings to come into contact with a brake surface arranged on a component which rotates with the wheel to be braked. In an attempt to ensure reliable operation of braking systems, legislation dictates a maximum permissible displacement of the brake lever, i.e. the maximum stroke of the lever, to still obtain maximum braking effect.

When new friction linings are fitted to a brake unit, the unit is adjusted so that a certain clearance is attained between the friction linings and the brake surface. In other words, a predetermined stroke of the brake lever will result in a maximum braking effect. Naturally, as the friction linings wear during use, the stroke of the brake lever will increase if the same braking effect is required. Once a certain degree of wear has taken place, the stroke can exceed the legislated maximum amount.

Accordingly, it is known to provide braking systems with means to compensate for friction lining wear, hereinafter termed an adjuster assembly, to thereby ensure that the stroke of the brake lever is always maintained within a predetermined length during the entire useful working life of the friction linings.

Known adjuster assemblies employ mechanical sensing means to determine the stroke of the brake lever. If the stroke exceeds a predetermined amount, the sensing means causes a take-up means to rotate to ensure that, in a released position, the brake linings sit closer to the brake surface than before rotation of the take-up means. To prevent the brake linings reverting to their original position when the brake lever is released, the sensing means communicates with the take-up means via a one-way clutch assembly so that the take-up means can only rotate in a direction which takes up excess play in the system.

When the brake linings have exceeded their useful working life, they must be removed from the brake unit and new linings fitted thereto. This implies that the adjuster assembly must be "released" so that sufficient clearance is attained to allow the new linings to be fitted. In one braking system, this is achieved by providing a multiplate clutch between the one-way clutch-assembly and the take-up means. By overcoming friction in the multiplate clutch, the take-up means can be rotated back to its original position.

Because it is necessary to be able to rotate the take-up means in one direction to take up play during operation of the braking system and in the opposite direction to release the adjuster assembly when new linings are to be fitted, a risk exists that the take-up means may be caused to rotate in the "release" direction, for example due to vibration, even when it is not intended to replace the linings. If this were to happen, the stroke of the brake lever would initially be longer than intended, though would adopt its operating length after several applications of the brakes.

SUMMARY OF INVENTION

The present invention in its several disclosed embodiments alleviates the drawbacks described above with respect to brake lining wear adjuster assemblies. It is therefore an object of the present invention to provide an adjuster assembly in which the risk of improper operation is reduced at the same time that servicing of the brake unit is not impaired. The specific structures through which these benefits are delivered will be described in detail hereinbelow.

BRIEF DESCRIPTION OF DRAWINGS

The invention will now be described in greater detail in the following way, by example only, and with reference to the attached drawings, in which.

DETAILED DESCRIPTION

Figure 1:
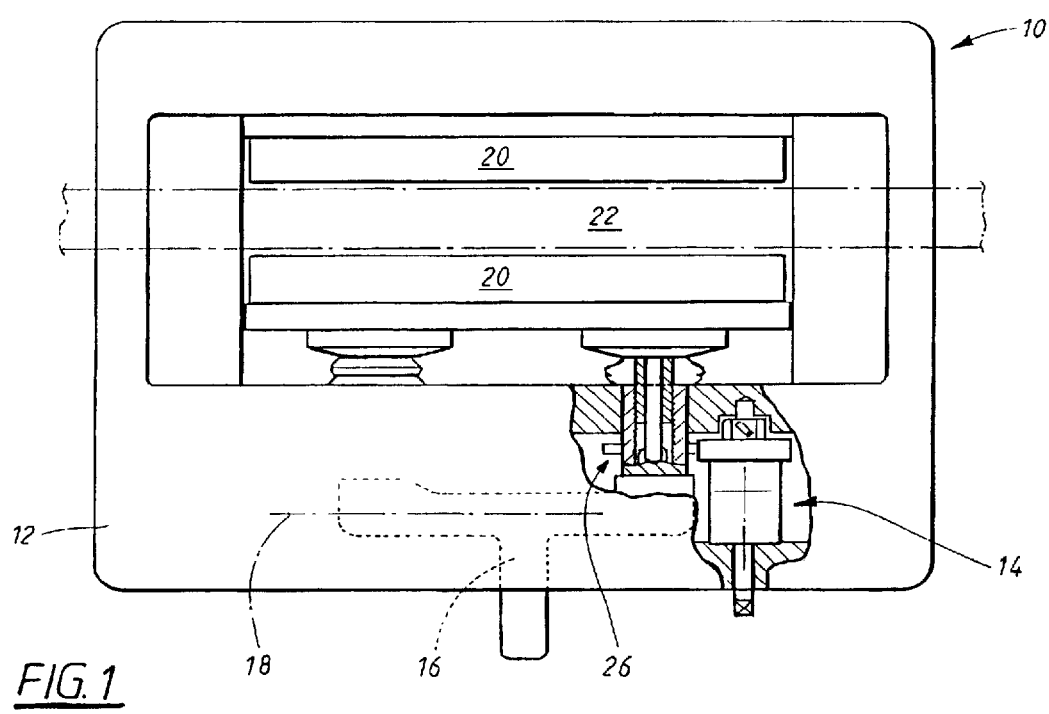
FIG. 1 is a schematic, partially sectioned view of a brake unit incorporating an adjuster assembly according to the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Referring to the drawings, reference numeral 10 generally denotes a brake unit for use in a vehicle braking system. The brake unit 10 comprises a housing 12 in which an adjuster assembly, generally denoted by reference numeral 14, is accommodated. The brake unit 10 further comprises a brake lever 16 journalled to the housing for rotation about an axis 18. The brake lever is adapted to magnify an input load generated by a pneumatic actuator (not shown) associated with the brake unit to cause at least one brake pad 20, and in the illustrated embodiment two brake pads 20, to engage a brake surface on a brake disc 22. Eccentric cam surfaces 24 on the brake lever 16 act on force transmitting means 26 arranged for slidable displacement in the housing 12.

In the illustrated embodiment, the brake lever 16 acts onpair of force transmitting means 26, with each force transmitting means comprising a pressure plate for transmitting the applied force to an internally threaded outer cylinder 30. An externally threaded inner cylinder 32 intermeshes with the outer cylinder 30 to transmit the applied force to a head piece 34. The inner cylinder 32 is axially displaceable along a rod 36 connected to the pressure plate 28. The pressure plate 28, rod 36 and inner cylinder 32 are locked against rotation. A gearwheel 38 is press-fitted to the outer cylinder 30 and the outer cylinder is arranged to be rotatable with respect to the pressure plate, rod and inner cylinder. Rotation of the gearwheel 38 in one direction will cause the inner cylinder to move away from the pressure plate 28 thereby displacing the brake pad towards the brake disc 22. Rotation of the gearwheel 38 in the opposite direction will cause the inner cylinder 32 to retract within the outer cylinder 30, thereby increasing clearance between the brake pad and the brake disc.

Rotation of the gearwheel 38 is affected by an adjuster gear 40 forming a part of the adjuster assembly 14 according to the present invention.

Figure 2:
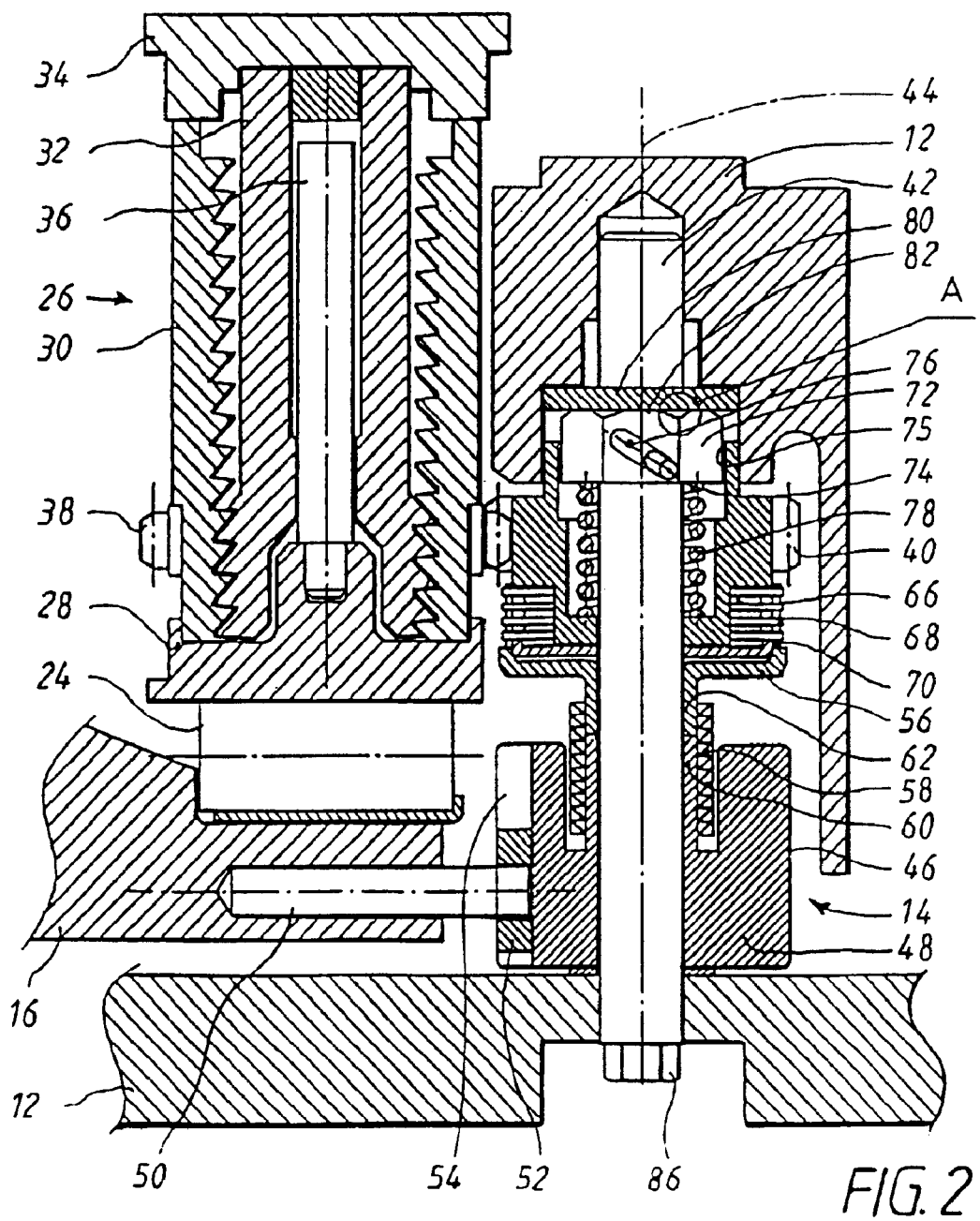
FIG. 2 is a schematic sectional view of one embodiment of an adjuster assembly according to the present invention mounted in a brake unit.

With particular reference to FIG. 2, the adjuster assembly 14 according to the present invention comprises a support shaft 42 which is adapted to be journalled for rotation about a rotational axis 44 in the housing 12. Sensing means 46, in the form of a cylindrical sleeve 48 mounted concentrically with the support shaft 42, is adapted for rotation about the rotational axis 44. The sensing means 46 is adapted for cooperation with the brake lever 16 via a drive pin 50 and, as shown, a sliding block 52 carried in an axially extending groove 54 in the cylindrical sleeve 48. In this manner, a displacement of the brake lever will be translated into a rotation of the sensing means about the rotational axis 44. Naturally, it will be evident to the skilled person that rotation of the sensing means due to displacement of the brake lever may be achieved in other ways. For example, the brake lever may be connected to the cylindrical sleeve via a gearwheel arrangement.

The sensing means 46 cooperates with a drive ring assembly 56 via a one-way clutch 58. In the illustrated embodiment, the one-way clutch is in the form of a helical spring overlying adjacent axially extending flange portions 60, 62 of the cylindrical sleeve and drive ring assembly, respectively. It is to be understood that any form of one-way clutch, for example a unidirectional roller bearing, may be employed for this purpose. In a manner which will be explained hereinbelow, the drive ring assembly 56 is adapted for rotation about the rotational axis 44 and, to a limited degree, about the support shaft 42.

As mentioned above, the adjuster assembly 14 further comprises an adjuster gear which is adapted to effect adjustment of the force transmitting means 26 via rotation of the gear wheel 38. The adjuster gear 40 cooperates with the drive ring assembly 56 via a torque-limiting clutch 66. For reasons which will be explained later, the drive ring assembly 56 is allowed to rotate a small amount, about 1 to 5 degrees, before clearance between the drive ring assembly and the torque-limiting clutch 66 is taken up. By the expression "torque-limiting clutch", it is hereby meant that, once the clearance has been taken up, rotation of the drive ring assembly 56 will be imparted to the adjuster gear 40 until a predetermined torque level is reached, at which level the clutch 66 will begin to slip to thereby allow the drive ring assembly 56 to rotate without rotating the adjuster gear 40. Advantageously, the torque-limiting clutch 66 is a multiplate clutch with one set of plates presenting radially protruding tangs 68 which are accommodated with said clearance in axially extending slots 70 in the drive ring assembly.

The adjuster gear 40 cooperates with the support shaft 42 via a transmission ring assembly 72. In the illustrated embodiment, the transmission ring assembly 72 is in the form of a threadless nut keyed to the support shaft 42 via a spigot 74. At least one shaped internal surface 75 on the adjuster gear 40 engages with a correspondingly shaped surface on the nut to ensure that the adjuster gear and the transmission ring assembly co-rotate. The spigot 74 advantageously passes diametrically through the support shaft 42 and respective free end regions of the spigot 74 are accommodated with clearance in diametrically opposed slots 76 in the transmission ring assembly 72.

As is clearly apparent from FIGS. 1 and 2, each slot 76 extends at an angle to the rotational axis 44, which angle is non-perpendicular to the rotational axis. Thus, and as will be explained in greater detail below, the transmission ring assembly 72 is capable of executing an axial displacement along the support shaft 42 when the support shaft is rotated in one direction.

Biasing means in the form of a spring member 78 acts between the adjuster gear 40 and the transmission ring assembly 72 to bias the transmission ring assembly away from the adjuster gear and towards engagement means 80 in the form of an insert non-rotatably affixed in the housing and concentric with the support shaft 42.

Figure 3:
FIG. 3 is an enlarged view taken at circle A in FIG. 2.

In accordance with the present invention, the transmission ring assembly 72 is provided with an engagement surface 82 forming an angle to the rotational axis 44. Preferably, the engagement surface 82 is perpendicular with respect to the rotational axis so that the engagement surface may contact a substantial portion of the engagement means 80. The engagement surface 82 is provided with rotation prevention means 84 adapted for releasable engagement with the engagement means 80. As is most clearly apparent from FIG. 3, the rotation prevention means 84 cooperates with the engagement means in a manner such that rotation of the transmission ring assembly 72 is possible in only one direction when the transmission ring assembly is in the position shown in FIG. 2; i.e. with the engagement surface 82 biased against the engagement means 80.

At its end remote from the transmission ring assembly 72, the support shaft 42 is provided with a free end region adapted to project out of the housing 12 and having means, for example a hexagonal head 86, to allow rotational forces to be applied to the shaft 42.

Operation of the adjuster assembly 14 in accordance with the teachings of the present invention will now be explained. Initial fitting of the brake pads 20 takes place with the adjuster assembly 14 and the force transmitting means 26 in the respective positions shown in FIG. 2. Accordingly, the inner cylinder 32 of the force transmitting means is withdrawn into the outer cylinder 30 thereby creating as large a clearance space as possible between the brake disc 22 and the head piece 34. Once new brake pads have been fitted, the support shaft 42 of the adjuster assembly is rotated clockwise as shown in FIG. 2 by the application of a suitable socket or wrench to the hexagonal head 86.

Clockwise rotation of the support shaft 42 is translated into clockwise rotation of the transmission ring assembly 72 due to interaction between the spigot 74 and the lower end region of the slot 76 in the transmission ring assembly. Due to the form of the engagement means 80 and the rotation prevention means 84, as well as the clearance for the spigot 74 in the slot 76, during clockwise rotation, the rotation prevention means 84 will ride over the engagement means 80 due to resilience in the spring member 78, thereby allowing the adjuster gear 40 to rotate with the support shaft 42. Due to the provision of the one-way clutch 58, clockwise rotation of the support shaft 42 will not be translated into rotation of the sensing means 46.

Clockwise rotation of the adjuster gear 40 imparts anticlockwise rotation to the gearwheel 38 of the force transmitting means 26. Since the inner cylinder 32 of the force transmitting means is prevented from rotation, anticlockwise rotation of the outer cylinder causes the inner cylinder to progress outwardly from the outer cylinder, thereby causing the brake pads 20 to approach the brake disc 22.

Clockwise rotation of the support shaft 42 is performed until a desired clearance between the brake pads and the brake disc is attained, whence rotation is ceased and the brake unit 10 is properly adjusted for normal operation.

During normal operation, displacement of the brake lever 16 causes the sensing means 46 to effect a clockwise angular displacement about the rotational axis 44. Due to the one-way clutch 58, the clockwise displacement of the sensing means 46 is transmitted to the drive ring assembly 56. The slots 70 in the drive ring assembly accommodate the tangs 68 of the torque-limiting clutch 66 with such clearance that the drive ring assembly 56, and hence the sensing means 46, are allowed to rotate through a certain angle corresponding to the permitted stroke of the brake lever 16 before the clearance is taken up. When the brake lever is released, its return motion causes the sensing means, and hence the drive ring assembly, to return to their initial positions.

After a certain amount of use, the brake pads will have worn to an extent such that the stroke length of the brake lever 16 imparts an angular displacement to the sensing means 46 which exceeds the amount of play between sidewalls of the slots 70 of the drive ring assembly and the tangs 68 of the torque-limiting clutch 66. In these circumstances, the drive ring assembly 56 imparts clockwise rotation via the torque-limiting clutch 66 to the adjuster gear 40. Although the adjuster gear 40 is coupled to the support shaft 42 via the transmission ring assembly 72, and the engagement surface 82 of the transmission ring assembly is in contact with the engagement means 80 affixed to the housing 12, the rotation prevention means 84 on the engagement surface 82 only prevents rotation in the anticlockwise direction. Hence, the adjuster gear 40, the transmission ring assembly 72 and the support shaft 42 are rotated clockwise.

As explained in connection with the initial fitting of the brake pads 20, clockwise rotation of the adjuster gear 40 results in the head piece 34 of the force transmitting means 26 approaching the brake disc 22. Accordingly, some of the clearance caused by wear to the brake pads is taken up between the brake pads and the brake disc.

When the brake lever 16 reverts to its initial position, the drive pin 50 rotates the sensing means 46 anticlockwise to its initial position. Anticlockwise rotation of the sensing means 46 causes the drive ring assembly 56 to be rotated anticlockwise due to friction between the flanges 60 and 62 of the cylindrical sleeve 48 and the drive ring assembly 56, respectively. This friction is overcome once the sidewalls of the slots 70 in the drive ring assembly contact the tangs 68 of the torque-limiting clutch 66, causing the one-way clutch 58 to slip, thereby allowing the sensing means 46 to revert to its initial position without continued rotation of the drive ring assembly 56.

Because of the interaction between the engagement surface 82 and the engagement means 80, there is little risk that the adjuster gear 40 can be caused to rotate anticlockwise even if the adjuster assembly 14 is subjected to tremendous vibration. Accordingly, the force transmitting means 26 cannot inadvertently be caused to impart a greater clearance between the brake pads 20 and the brake disc 22.

During very heavy braking, the brake pads 20 may become compressed to such a degree that the sensing means 46 of the adjuster assembly 14 detects that the stroke of the brake lever 16 has exceeded the predetermined maximum value. If, however, the adjuster assembly under these circumstances were to respond by taking up clearance between the brake pads and the brake disc, there would be a very real risk that once the brake lever returned to its initial position, the brake pads would bind on the brake disc.

This above-described risk is avoided in the present invention in the following manner. When a very heavy braking force is applied via the brake lever 16 to the force transmitting means 26, the threads on the inner and outer cylinders 30, 32 are clamped together with such a force that they are effectively locked against rotation. Thus, the sensing means 46 will be rotated clockwise by the drive pin 50, causing the drive ring assembly 56 to be co-rotated until the clearance between the slots 70 of the drive ring assembly and the tangs 68 of the torque-limiting clutch 66 is taken up. Since the adjuster gear 40 is locked against rotation by the lock-up of the threads in the force transmitting means 26, continued application of torque by the drive ring assembly 56 on the torque-limiting clutch 66 will cause the clutch to slip, therefore permitting the drive ring assembly to continue rotation with the sensing means 46 without affecting rotation of the adjuster gear 40. In this manner, no take up of clearance between the brake pads 20 and the brake disc 22 will occur, even though the sensing means 46 detects a stroke of the brake lever which is greater than the predetermined maximum.

After an incidence of very heavy braking, the adjuster assembly reverts to its initial position in the same manner as described above.

When it becomes necessary to change the brake pads 20 due to excessive wear, it is necessary to retract the inner cylinder 32 of the force transmitting means 26 into the outer cylinder 30 to thereby obtain maximum clearance between the head piece 34 and the brake disc 22. This is achieved in the following manner. A suitable socket or wrench is applied to the hexagonal head 86 of the support shaft 42. Upon initial anticlockwise rotation of the support shaft, the spigot 74 acts on the transmission ring assembly 72, via the inclined slots 76, to cause the transmission ring assembly to be axially displaced along the support shaft 42 in a direction away from the engagement means 80 to compress the spring member 78. In this manner, the engagement surface 82 of the transmission ring assembly is freed from the engagement means 80.

Anticlockwise rotation of the support shaft 42 is resisted by the sensing means 46 since the sensing means is coupled to the brake lever 16 via the drive pin 50. Nevertheless, anticlockwise rotation of the support shaft is possible since the torque applied to the torque-limiting clutch 66 by the adjuster gear 40 is sufficient to cause the clutch to slip, thereby permitting the adjuster gear 40 to co-rotate with the support shaft 42 while the drive ring assembly 56 and the sensing means 46 remain stationary.

Accordingly, continued anticlockwise rotation of the support shaft 42 will result in anticlockwise rotation of the adjuster gear 40. This, in turn, causes the outer cylinder 30 of the force transmitting means 26 to be rotated clockwise.

In this manner, the inner cylinder 32 is retracted into the outer cylinder 30, thereby increasing the clearance between the head piece 34 and the brake disc 22.

To prevent possible damage to any of the components making up the adjuster assembly and the force transmitting means as a result of violent forces being applied to the support shaft 42 during retraction of the inner cylinder 32, for example if the support shaft were to be rotated by a pneumatic wrench, in a preferred embodiment of the invention the spigot 74 is designed to shear should a torque be applied to the free end region of the support shaft above a predetermined value.

The invention is not restricted to the embodiments described above and illustrated in the drawings, but may be varied within the scope of the appended claims. For example, although the invention has been described in connection with a disc brake unit, it will be evident to the skilled person that the adjuster assembly of the present invention may equally be applied to a drum brake system. Indeed, the adjuster assembly of the present invention could conceivably be employed in any circumstance in which it is desirable to compensate for wear in a brake system. Furthermore, although the rotation prevention means 84 on the engagement surface 82 have been shown in the form of a saw-tooth pattern, it will be appreciated that any mechanical engagement means may be employed which permits rotation in one direction only. In addition, it will be apparent to the skilled person that the invention may be practiced with the spigot 74 formed in the transmission ring assembly 72 and the slot 76 in the support shaft 42. Alternatively, the support shaft 42 may present a threaded portion which cooperates with a groove in the transmission ring assembly or vice-versa. Naturally, the adjuster assembly of the invention will still operate as intended by combining the actions of the one-way clutch and the torque limiting clutch in one unit.

What is claimed is:

1. An adjuster assembly for compensating for brake lining wear in a brake unit having a housing for accommodating said adjuster assembly, a brake lever adapted to be journalled to the housing, and a force transmitter for transmitting displacement of said brake lever to at least one brake lining, said adjuster assembly comprising:
   a support shaft adapted to be journalled for rotation about a rotational axis in a housing;
   a sensor adapted for rotation about said rotational axis, said sensor being further adapted for cooperation with said brake lever to translate a displacement of said brake lever into a rotation of said sensor;
   a drive ring assembly adapted for rotation about said rotational axis, said drive ring assembly cooperating with said sensor via a one-way clutch, and an adjuster gear arranged for at least partial rotation with said support shaft and adapted to effect adjustment of said force transmitter, said adjuster gear cooperating with said drive ring assembly via a torque-limiting clutch and with said support shaft via a transmission ring assembly, said transmission ring assembly having an engagement surface forming an angle to said rotational axis wherein said engagement surface is provided with a rotation preventer adapted for releasable engagement with an engagement member adapted for cooperation with the housing for preventing rotation of said transmission ring assembly in one direction.

2. The adjuster assembly as claimed in claim 1, wherein said transmission ring assembly is axially displaceable along said support shaft.

3. The adjuster assembly as claimed in claim 2, wherein said transmission ring assembly cooperates with said support shaft via a spigot carried on said support shaft.

4. The adjuster assembly as claimed in claim 3, wherein said transmission ring assembly is provided with a slot, said slot running non-perpendicularly to said support shaft, said slot being adapted to accommodate a free end region of said spigot.

5. The adjuster assembly as claimed in claim 2, wherein a biasing member acts on said transmission ring assembly such that said engagement surface is biased towards said engagement member capable of cooperation with the housing when said adjuster assembly is mounted in a brake unit.

6. The adjuster assembly as claimed in claim 1, wherein said one-way clutch is a torque limiting clutch.

7. The adjuster assembly as claimed in claim 1, wherein said one-way clutch further comprises a unidirectional bearing.

8. The adjuster assembly as claimed in claim 1, wherein said support shaft is provided with a free end region adapted to project out of the housing, said free end region being adapted to allow rotational forces to be applied to said support shaft.

9. The adjuster assembly as claimed in claim 3, wherein said spigot is adapted to shear should a torque be applied to said free end region of said support shaft above a predetermined value.

10. The adjuster assembly as claimed in claim 6, wherein said torque limiting clutch is a multi-plate clutch.

11. A vehicular brake unit comprising an adjuster assembly for compensating for brake lining wear in a brake unit having a housing for accommodating said adjuster assembly, a brake lever adapted to be journalled to said housing, and a force transmitter for transmitting displacement of said brake lever to at least one brake lining, said adjuster assembly comprising:
    a support shaft adapted to be journalled for rotation about a rotational axis in said housing;
    a sensor adapted for rotation about said rotational axis, said sensor being further adapted for cooperation with said brake lever to translate a displacement of said brake lever into a rotation of said sensor;
    a drive ring assembly adapted for rotation about said rotational axis, said drive ring assembly cooperating with said sensor via a one-way clutch, and an adjuster gear arranged for at least partial rotation with said support shaft and adapted to effect adjustment of said force transmitter, said adjuster gear cooperating with said drive ring assembly via a torque-limiting clutch and with said support shaft via a transmission ring assembly, said transmission ring assembly having an engagement surface forming an angle to said rotational axis wherein said engagement surface is provided with a rotation preventer adapted for releasable engagement with an engagement member adapted for cooperation with said housing for preventing rotation of said transmission ring assembly in one direction.

12. A vehicle having a brake unit comprising an adjuster assembly for compensating for brake lining wear in a brake unit having a housing for accommodating said adjuster assembly, a brake lever adapted to be journalled to said housing, and a force transmitter for transmitting displacement of said brake lever to at least one brake lining, said adjuster assembly comprising:
    a support shaft adapted to be journalled for rotation about a rotational axis in said housing;
    a sensor adapted for rotation about said rotational axis, said sensor being further adapted for cooperation with said brake lever to translate a displacement of said brake lever into a rotation of said sensor;

a drive ring assembly adapted for rotation about said rotational axis, said drive ring assembly cooperating with said sensor via a one-way clutch, and an adjuster gear arranged for at least partial rotation with said support shaft and adapted to effect adjustment of said force transmitter, said adjuster gear cooperating with said drive ring assembly via a torque-limiting clutch and with said support shaft via a transmission ring assembly, said transmission ring assembly having an engagement surface forming an angle to said rotational axis wherein said engagement surface is provided with a rotation preventer adapted for releasable engagement with an engagement member adapted for cooperation with said housing for preventing rotation of said transmission ring assembly in one direction.

\* \* \* \* \*